(12) United States Patent
Gao et al.

(10) Patent No.: US 11,308,294 B2
(45) Date of Patent: Apr. 19, 2022

(54) DATA READER WITH VIEW SEPARATION OPTICS

(71) Applicant: Datalogic USA, Inc., Eugene, OR (US)

(72) Inventors: WenLiang Gao, Eugene, OR (US); Alan Shearin, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 666 days.

(21) Appl. No.: 15/336,174

(22) Filed: Oct. 27, 2016

(65) Prior Publication Data

US 2018/0121694 A1  May 3, 2018

(51) Int. Cl.
*G06K 7/10*  (2006.01)

(52) U.S. Cl.
CPC .................... *G06K 7/10732* (2013.01)

(58) Field of Classification Search
CPC ........... G06K 7/10851; G06K 7/10861; G06K 7/10693; G06K 7/10811; G06K 7/10871; G06K 7/10881; G06K 7/10594; G06K 7/10663; G06K 7/10702; G06K 7/10792; G06K 2207/1012; G06K 7/10; G06K 7/10564; G06K 7/10584; G06K 7/10603; G06K 7/10673; G06K 7/10801; G06K 7/10891; G06K 7/14; G06K 7/10722; G06K 7/1096; G06K 2207/1013; G06K 7/109; G06K 17/0022; G06K 2207/1016; G06K 2207/1017; G06K 2207/1018; G06K 7/10613; G06K 7/10742; B82Y 15/00; G02B 26/10; G02B 26/106; G07F 11/002; G07G 1/0045; G07G 1/0054

USPC ..................................................... 235/462.42
See application file for complete search history.

(56) References Cited

U.S. PATENT DOCUMENTS

| | | | | |
|---|---|---|---|---|
| 5,049,740 A | * | 9/1991 | Pines ..................... | G02B 26/10 244/3.16 |
| 5,315,428 A | * | 5/1994 | Peng ................... | G06K 7/10693 250/233 |
| 5,418,364 A | | 5/1995 | Hale et al. | |
| 5,456,256 A | * | 10/1995 | Schneider ............ | A61B 5/1172 600/445 |
| 6,100,517 A | * | 8/2000 | Yahav .................. | G01C 11/025 250/208.1 |
| 6,281,657 B1 | * | 8/2001 | Matsuo .............. | G02B 21/0044 318/661 |

(Continued)

*Primary Examiner* — Thien M Le
*Assistant Examiner* — Tae W Kim
(74) *Attorney, Agent, or Firm* — Stoel Rives LLP

(57) ABSTRACT

Disclosed is a data reader and method of data reading for an imager with multiple fields of view, including directing a first field of view of the imager along a first path, directing a second field of view of the imager along a second path, and alternately selecting one of the first view or the second view via a view splitting/combining system comprising a rotating mechanism (e.g., a disk), disposed in the view path of the imager, the disk having reflective and transmissive/open portions. The system may include synchronization between rotation of the rotating disk and the imager, one synchronization comprises using a magnet on the rotating disk and a Hall sensor on a printed circuit board beside the rotating disk, the Hall sensor output then being used to synchronize image capture to motor position. Other synchronization methods are disclosed.

20 Claims, 9 Drawing Sheets

(56) References Cited

U.S. PATENT DOCUMENTS

| | | | | |
|---|---|---|---|---|
| 6,899,272 B2* | 5/2005 | Krichever | ............ | G06K 7/10693 |
| | | | | 235/440 |
| 8,684,269 B2 | 4/2014 | Gregerson | | |
| 9,141,842 B2* | 9/2015 | Gao | .................... | G06K 7/10861 |
| 9,542,582 B2 | 1/2017 | McQueen | | |
| 2010/0270376 A1 | 10/2010 | McQueen | | |
| 2013/0206839 A1* | 8/2013 | Gao | .................... | G06K 7/10861 |
| | | | | 235/462.42 |
| 2013/0242289 A1* | 9/2013 | Miyajima | ............ | G01D 5/3473 |
| | | | | 356/72 |
| 2015/0070001 A1* | 3/2015 | Villaret | .................. | G01D 5/145 |
| | | | | 324/207.2 |

\* cited by examiner

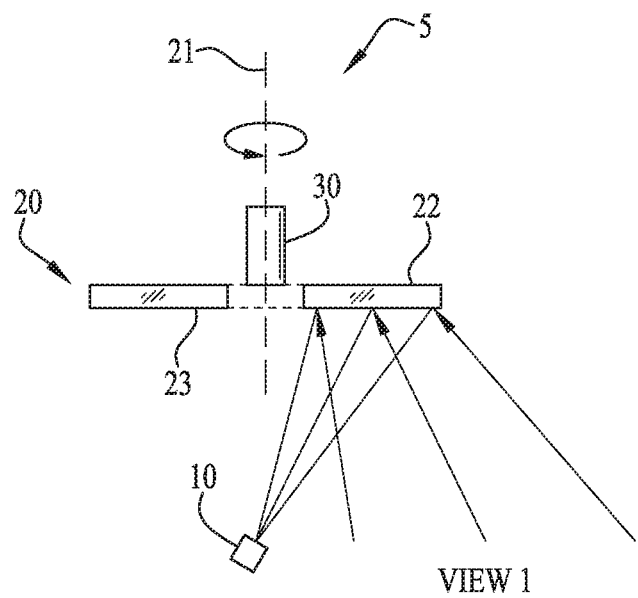
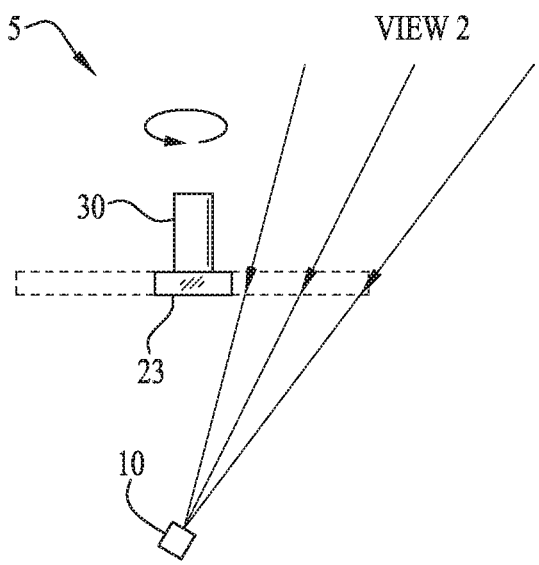
FIG. 1
FIG. 3
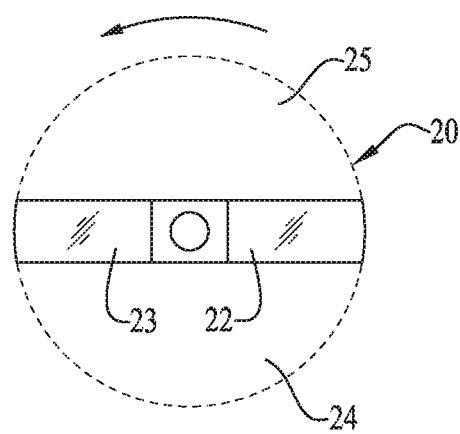
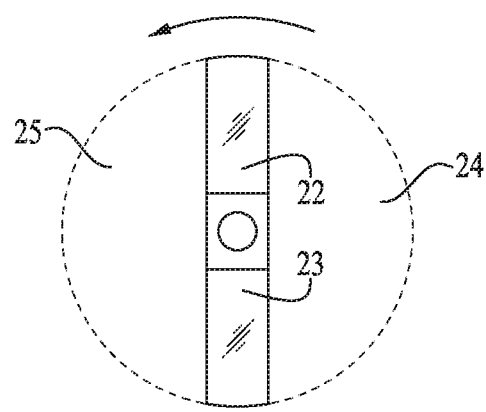
FIG. 2
FIG. 4

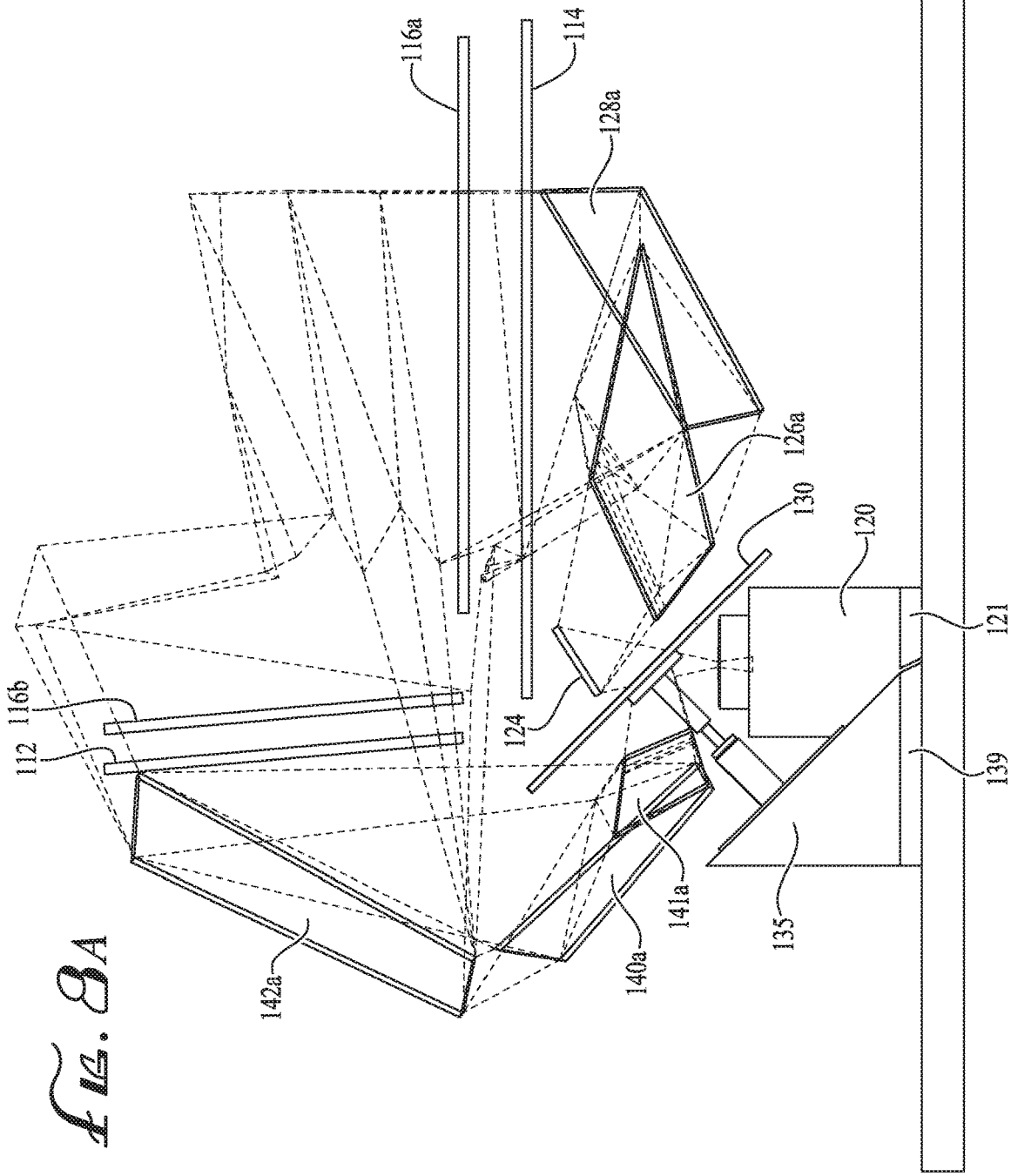

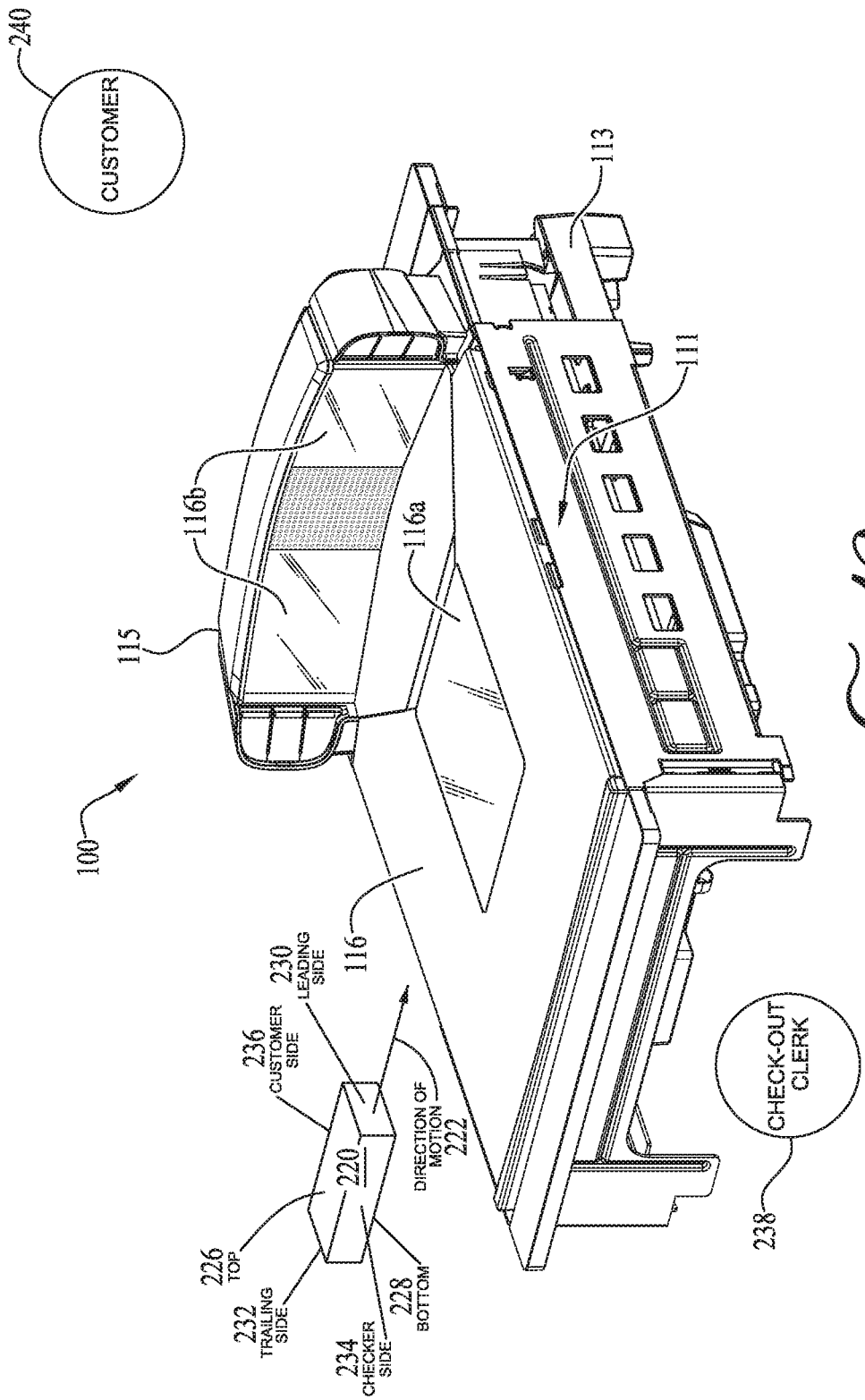

DATA READER WITH VIEW SEPARATION OPTICS

BACKGROUND

The field of the present disclosure relates generally to data readers and, in particular, to systems and methods for generating image data from multiple views of an imaging data reader for reading items such as optical codes.

Optical codes have widespread applications. For example, optical codes can be used to identify a class of objects (e.g., merchandise) or unique items (e.g., patents). As a result, optical codes are found on a wide variety of objects, such as retail goods, company assets, and documents, and help track production at manufacturing facilities and inventory at stores (by scanning items as they arrive and as they are sold). In addition, optical codes may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause an optical code to be displayed on their portable electronic device so that an employee (e.g., merchant-employee) can read the optical code via a data reader to allow the customer to redeem a coupon or to verify that the customer has purchased a ticket for the event.

Optical code readers or data readers are used to capture optical codes or other symbols or information appearing on various surfaces in order to read the information encoded in the optical code or symbol. One commonly used data reader is an imager-based reader. Imager-based readers typically include solid state image circuitry, such as charge coupled devices (CCDs) or complementary metal-oxide semiconductor (CMOS) devices, and may be implemented using a one-dimensional or two-dimensional imaging array of photosensors (or pixels) to capture an image of the optical code. One-dimensional CCD readers capture a linear cross-section of the optical code, producing an analog waveform whose amplitude represents the relative darkness and lightness of the optical code. Two-dimensional CCD or CMOS readers may capture an entire two-dimensional image. The image is then processed to find and decode an optical code. For example, virtual scan line techniques are known techniques for digitally processing an image containing an optical code by looking across an image along a plurality of lines, typically spaced apart and at various angles, somewhat like a scan pattern of a laser beam in a laser-based scanner.

Imager-based readers typically form images from one perspective, usually that of a normal vector directed from the face of the imager. Such imager-based readers therefore provide only a single point of view. It may be desirable in certain applications to take images from multiple perspectives. A few imager-based readers that generate multiple perspectives are known. One such reader is disclosed in U.S. Pat. No. 9,141,842 which discloses an embodiment having an imager exposed to multiple fields of view that are alternately illuminated, and using a dichroic mirror as a beam splitter configured to direct light from a first field of view along a first path to the imager and a second field of view along a second path to the imager.

SUMMARY OF THE DISCLOSURE

The present disclosure is directed to systems and method for generating image data using a data reader having an imager with multiple fields of view.

One method includes directing a first field of view of the imager along a first path, directing a second field of view of the imager along a second path, and alternately selecting one of the first view or the second view via a view splitting/combining system comprising a rotating mechanism (e.g., a disk) having alternating reflective and transmissive/open portions.

The system may include means for synchronization between rotation of the rotating disk and the imager. One method comprises using a magnet on the rotating disk and a Hall sensor on a printed circuit board below, the Hall sensor output then being used to synchronize image capture to motor position. Other synchronization methods are disclosed and envisioned.

Additional aspects and advantages will be apparent from the following detailed description of preferred embodiments, which proceeds with reference to the accompanying drawings.

BRIEF DESCRIPTION OF THE DRAWINGS

FIGS. 1-4 are diagrams of a rotating disk view separation system for a data reader according to a first embodiment with four image captures per revolution of the disk, FIG. 1 being a side view with the disk being at a first position, FIG. 2 being a top view of FIG. 1, FIG. 3 being a side view with the disk in a second position, FIG. 4 being a top view of FIG. 3.

FIG. 8A is a side isometric view and FIG. 8B is a front isometric view of a data reader according to an embodiment illustrating view patterns in a read volume.

FIG. 10 is an isometric view of a data reader illustrating an exemplary six-sided box-shaped object that may be passed through a view volume of the data reader, according to an embodiment.

DETAILED DESCRIPTION OF EMBODIMENTS

Figure 5:
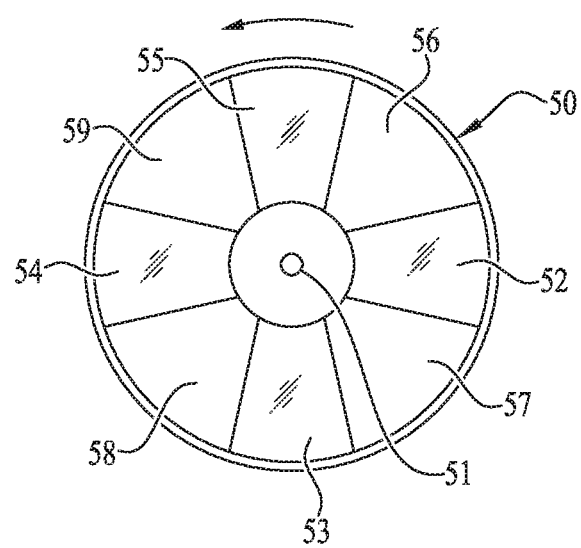
FIG. 5 is a diagram of a rotating disk according to a second embodiment with eight image captures per revolution.

With reference to the above-listed drawings, this section describes particular embodiments and their detailed construction and operation. The embodiments described herein are set forth by way of illustration only and not limitation. Those skilled in the art will recognize in light of the teachings herein that, for example, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments. Various types of data acquisition devices, such as optical code readers, are generally known including imaging-based data readers and laser scanners, both fixed and handheld. For the purposes of the present description, the terms scanner and data reader may be used interchangeably.

FIGS. 1-4 are diagrams of a rotating disk view separation system 5 for a data reader according to a first embodiment. The system 5 includes a camera 10, a view splitting system comprising a rotating disk 20 and motor 30. The rotating disk 20 includes a first mirror section 22 and a second mirror section 23 disposed on opposite sides of the rotational axis 21 (center of rotation) and arranged in a common plane. The first mirror section 22 and the second mirror section 23 are of like size configuration so as to be rotationally balanced. The mirror sections 22, 23 may be separate/separated sections or they may comprise a single mirror panel extending across the disk center forming a rectangular-shaped disk. The disk 20 has void or gap sections 24, 25 disposed between the mirror sections 22, 23. Alternately the void sections may comprise clear panels, such as glass, but such material may cause some loss in light transmission. Other configurations are contemplated, some of which are set forth below.

As the disk 20 is rotated by the motor 30 about the rotational axis 21, mirror and void sections are alternately disposed in the view path of the camera 10, consecutively, namely in sequence, mirror section 22, then void section 24, then mirror section 23, then void section 25. The camera 10 is timed to take four images per revolution (one image per section 22-25). The motor 30 is preferably a brushless dc motor that has a proven lifetime in barcode scanner applications such as model SKC20312 available from Shinano Kenshi Co., Ltd of Japan, or the model DR-24312-124 motor also available from Shinano Kenshi Co., Ltd of Japan. When the disk 20 rotates to position 1 as in FIGS. 1-2 (time T1), the whole view of the camera 10 is reflected by mirror section 22, whereby the camera 10 captures image of optical View 1. When the disk rotates to position 2 as in FIGS. 3-4 (at time T2), the whole view of camera 10 passes through void section 24, whereby the camera 10 captures image of optical View 2. Thus as the disk 20 rotates one revolution, the camera captures a total of four images, two images of View 1 and two images of View 2. Capturing four images per revolution, one 80 fps (frames per second) imager can cover two separate optical views in 40 fps each.

The imager (of the camera 10) is triggered at each mirror and gap position. In the example disk 5 of FIG. 1, there are two mirror sections and two void sections every revolution. If a 40 fps (frames-per-second) per optical view is required, Motor speed in rpm=(frame-rate-per-view*2)/(number of image captures/revolution)*60

Example 1 frame rate=40 fps,
# of capture/rev=4 (for 2 mirror+2 void case of FIGS. 1-4)
Motor speed=40 fps*2/4*60=1200 revolutions-per-minute.

FIG. 5 is a diagram of a rotating disk 50 according to another example embodiment. The disk 50 includes four mirror sections 52, 53, 54, 55 evenly disposed about a center of rotation 51 with four void sections 56, 57, 58, 59, one void section disposed between consecutive mirror sections. In operation, the camera captures a total of eight images per revolution. In this way, one 80 or higher fps imager can cover two separate optical views in 40 fps each (at a motor speed of 600 rpm).

Figures 6, 7:
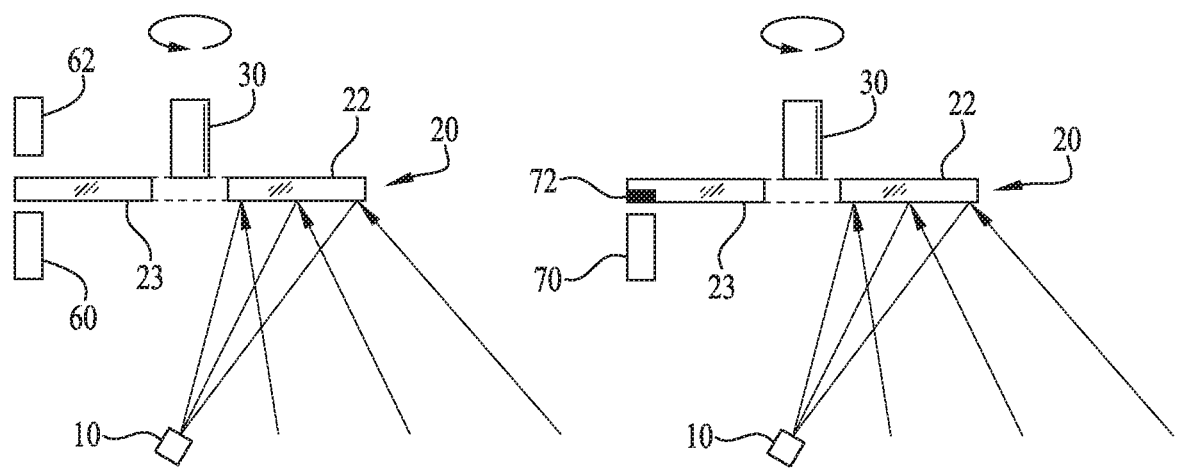
FIG. 6 is a diagram of a position detector system for a rotating disk according to a first embodiment.
FIG. 7 is a diagram of a position detector system according to a second embodiment.

Operation is preferably synchronized between disk rotation and image capture by the camera. FIG. 6 illustrates a first synchronization system comprising an LED (light emitting diode) 60 (or other light source) disposed on one side of the disk 20 and a photo diode 62 (or other light detector) disposed on the opposite side. When the photo diode 62 detects the LED 60 (and generates a signal), that signal means that photo diode has detected the trailing edge of the mirror, thereby triggering the camera to capture image of optical View 2 through the void section. Alternately (or in combination), when the photo diode 62 goes from detecting the LED light to not detecting (and generates a signal), that signal means that it has detected the leading edge of the mirror section for triggering the camera to capture an image of optical View 1 via reflection off the mirror section. In some embodiments, the disk 20 may employ a single LED/photo diode pair 60, 62 because the rest of the mirror or void positions may be derived from the one signal since the speed change is not significant within one revolution, and the mirror/void size is larger than the optical view for tolerance.

Alternately, the photo diode and the LED may be positioned on the same side of the disk, with the light from the LED reflecting off the mirror section back to the photo diode indicating presence of the mirror section, and producing the timing signal. Mounting the LED and the photo diode on the same side may provide for an alternate or more convenient component arrangement.

FIG. 7 illustrates a second synchronization system comprising a magnet 72 embedded in the disk 20 in the mirror section 23 and a Hall sensor 70 disposed on a printed circuit board of the motor drive. When the Hall sensor 70 detects presence of the magnet 72, the sensor 70 generates an output signal that may be used to trigger the camera 10 and thereby synchronizes image capture and motor/disk position. In some embodiments, the disk 20 may employ a single Hall sensor/magnet pair because the rest of the mirror or void positions may be derived from the one signal since the speed change is not significant in one revolution, and the mirror/void size is larger than the optical view for tolerance.

Figure 12:
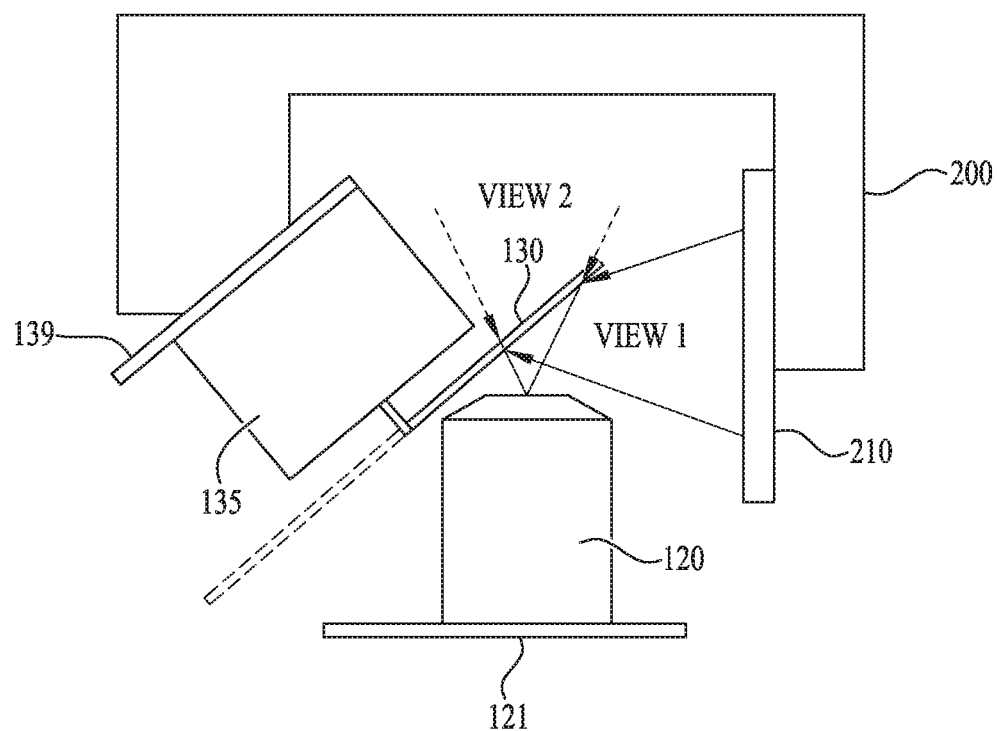
FIG. 12 is a diagram of a view separation system further including a timing fixture.

A third synchronization system embodiment uses the tachometer (Tacho) output of the Hall timing+sensor(s) included in the brushless dc (BLDC) motor as the camera trigger signal. One such motor is the model SKC20312 available from Shinano Kenshi Co., Ltd., Japan. Aligning the camera trigger with only one void or mirror may be adequate, and the rest of the image captures may be controlled/triggered by signals from the Hall sensors of the BLDC motor. FIG. 12 illustrates a whole module (BLDC motor 135 with drive circuit+motor driver board 139) mounted on a fixture 200, the fixture including an additional mirror 210 for reflecting the View 1 back to the mirror section on the rotating disk 130, so that the imager of camera module 120 will see the whole mirror, with an alignment mark at the center, wherein the rotating disk position (and thus the mirror section) is adjusted until the mirror section (i.e., the alignment mark) is at the center on the imager of the camera module 120.

FIG. 10 illustrates an example data reader 100 comprising a multiple-window reader having a lower section 111 and an upper section 115 arranged generally orthogonally to one another. The lower section 111 includes a lower/horizontal window 116a in the platter 116. The upper section 115 in this embodiment includes an upper/vertical window 116b (actually a split window divided by a speaker grille disposed therebetween). The components of the data reader are mounted (directly or indirectly) to a common base or chassis 113.

For purposes of description, as shown in FIG. 10, the data reader 100 may be described with reference to an exemplary object 220 that may be passed through a view volume of the data reader 100. The object 220 is represented by a rectangular shaped six-sided polyhedron, such as a cereal box (hereinafter referred to as a box-shaped item, package or object) being passed through a read region above the lower window 116a in the platter 116 and to the side of upper window 116b. For convenience of description, referring to FIG. 10, this box-shaped object 220 may be described with respect to its direction of motion/travel 222 across a surface of the platter 116. The illustrated example shows the direction of motion 222 of the object 220 being in a left-to-right scheme, but other directions such as right-to-left are applicable.

For the purposes of description relative to the ability of a data reader 100 to read certain of the sides of the box-shaped object 220 being passed through the read volume defined by the windows 116a, 116b in the orientation as illustrated, the box-shaped object 220 may be described as having a top side 226, a bottom side 228, and four lateral sides 230, 232, 234, and 236. The lateral sides may be referred to as the leading (or right lateral) side 230 (the side leading the object as it is passed through the read region), the trailing (or left lateral) side 232 (the trailing side of the object as it is passed through the read region), the checker (or front lateral) side 234 (due to its proximity to a checkout clerk 238), and the customer (or rear lateral) side 236 (due to its proximity to a customer 240). A housing section, namely the upper housing section 115 of a data reader 100, may separate the customer 240 from the object 220 if the data reader is a vertical optical code reader or a bi-optic optical code reader. The customer (or rear lateral) side 236 may alternatively be described as a side oriented generally vertically facing the upper window 116b. The checker (or front lateral) side 234 may alternatively be described as the side facing opposite the customer side 236. The front and rear lateral sides 234, 236 may be described as being disposed to one side of the upper window 116b in a direction parallel to the direction of motion 222 for the object 220.

Figure 8B:
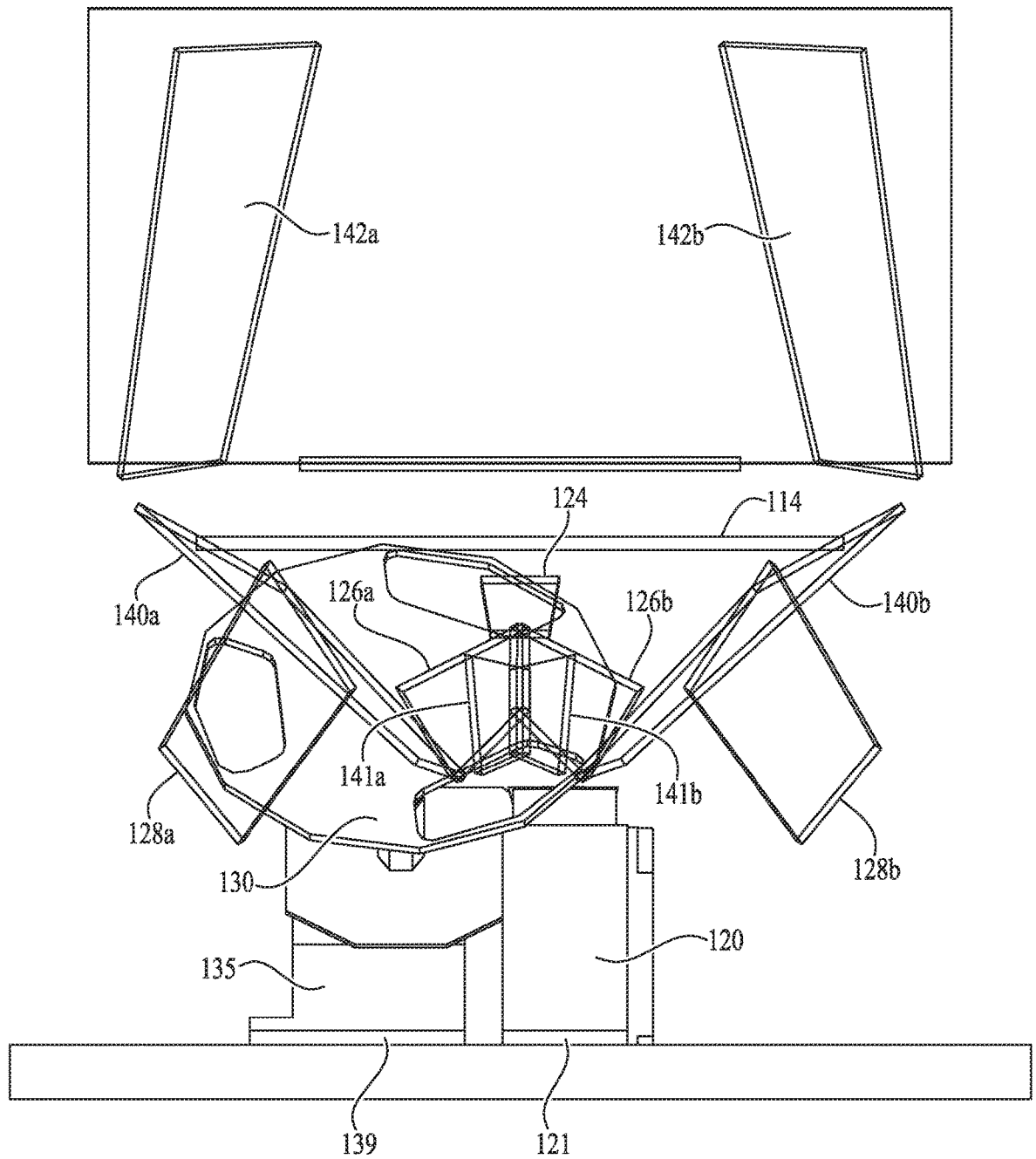

In some embodiments, the fields of View 1 and View 2 correspond to different views out of a bioptic data reader, such as the data reader 100 in FIGS. 8A, 8B. Alternately, the fields of View 1 and View 2 may be applied to other scanner configurations to generate two views from one camera, such as a portal scanner for scanning items on a fast conveyor system where an expensive high speed, high pixel count camera may be employed.

Figure 9A:
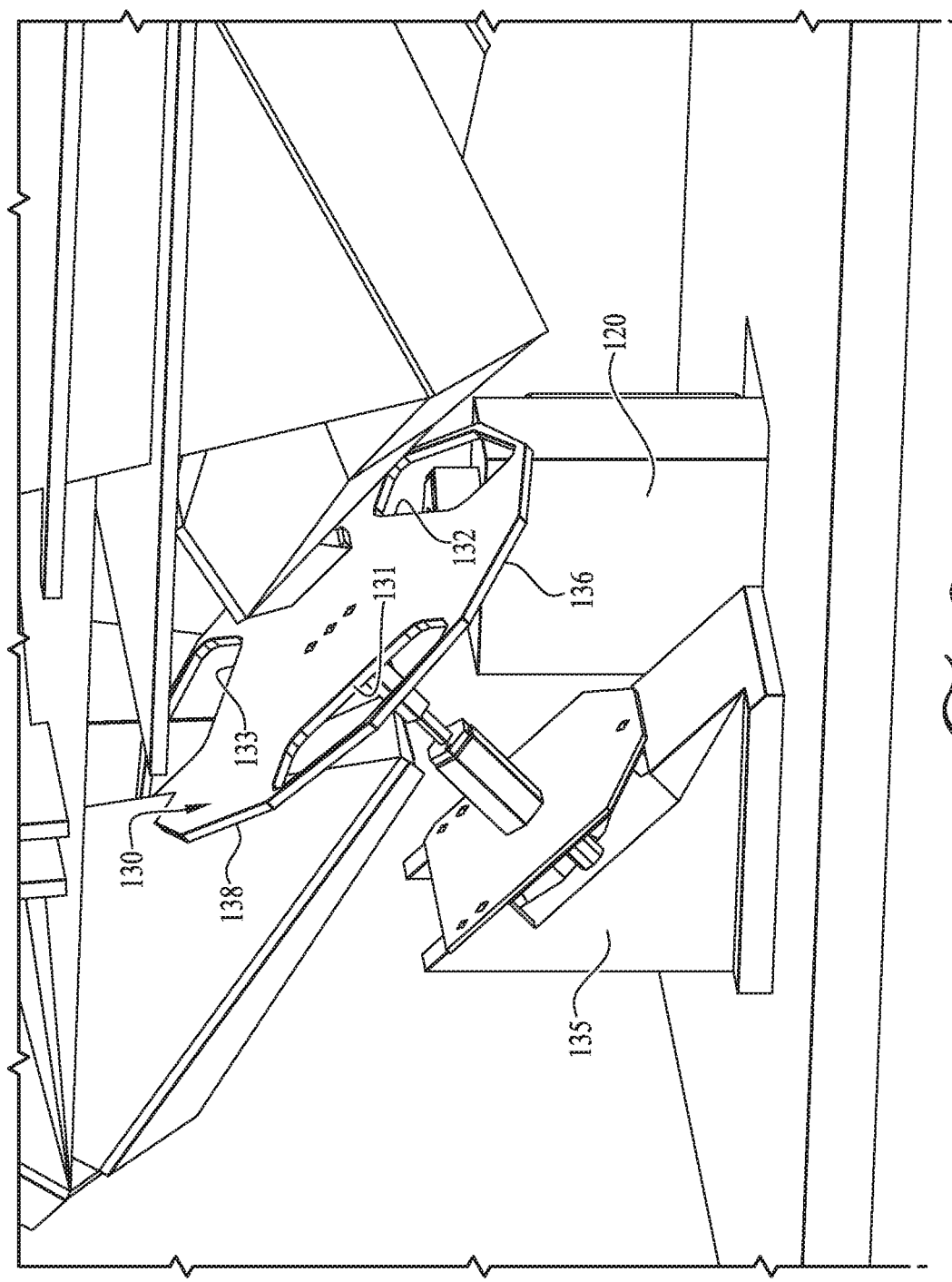
FIG. 9A is an isometric view of the view separation system for the data reader of FIGS. 8A, 8B, on an enlarged scale.

FIGS. 8A-8B and 9A illustrate the data reader 100 having a housing (removed for facilitating viewing of the components) and including a vertical window 112 and a horizontal window 114 (disposed below the platter 116 and lower window 116a). Multiple views are produced via a rotating disk 130 (of any of the prior embodiments 30, 50) or via the three mirror embodiment as illustrated in FIGS. 9A-9B, the disk being rotated by motor 135.

Figure 9B:
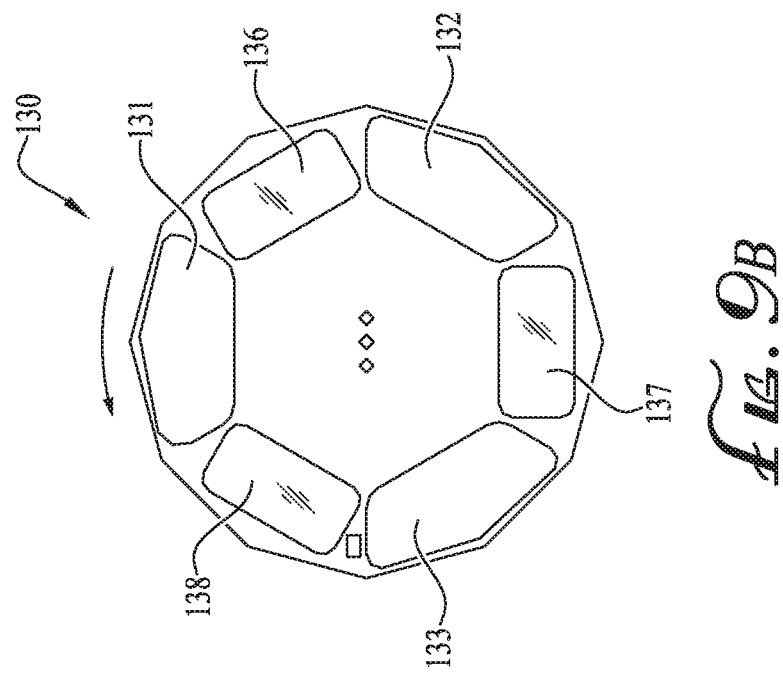
FIG. 9B is a diagram of a bottom view of the rotating disk of the view separation system of FIG. 9A, with six image captures per revolution.

FIG. 9A is an enlarged view of the view separation system and rotating disk 130 and FIG. 9B is a diagram of the disk 130 according to a third embodiment with six image captures per revolution. The disk 130 includes three mirror sections 136, 137, 138 evenly disposed about a center of rotation with three void sections 131, 132, 133, one void section disposed between consecutive mirror sections. In operation, the camera (or camera module) 120 captures a total of six images per revolution. In this way, one 80 or higher fps (frames per second) imager can cover two separate optical views in 40 fps each.

Example frame rate=40 fps,
# of capture/rev=6 (for 3 mirror+3 void case of FIG. 9C)
Motor speed=40 fps*2/6*60=800 revolutions-per-minute.

The shape of the disk 130 may be round (as shown in the embodiment of FIGS. 1-4), a polygon shape (e.g., a twelve-sided polygon as shown in the embodiment of FIGS. 9A, 9B), square or rectangular, oval, or any other suitable shape.

The motor 135, which may be a brushless dc motor, may be mounted or disposed on a motor driver PCB (printed circuit board) 139 and the camera module 120 may be mounted or disposed on an imager PCB 121. A system controller 150 is connected to the controller of the camera module 120 (on PCB 121), the controller of the motor 135 (on PCB 139) and the controller for illumination sources (if provided).

Referring to FIGS. 8A, 8B, the rotating disk 130 has alternating mirror (reflective) sections and void/gap (pass through) sections which are alternately positioned in the field of view of the camera module 120 as the disk rotates, the disk either reflecting the view (View 1) off the mirror sections or passing the view (View 2) through the void/gap sections. View 1 reflects off the mirror section of the disk 130 is directed toward split mirror 141a, 141b which splits the view being directed through the vertical window 112. The mirror 141a directs a view to mirror 140a which in turn reflects the view upwardly towards mirror 142a which in turn directs the view sidewardly through the vertical window 112 and into the view volume. Similarly, mirror 141b directs a view to mirror 140b which in turn reflects the view upwardly towards mirror 142b which in turn directs the view sidewardly through the vertical window 112 and into the view volume. These views through the vertical window 112 are thus arranged for capturing views of the customer side and potentially the trailing side, the leading side and the top side of an item being passed through the view volume.

View 2 passes upward through a void section of the rotating disk 130 toward a fold mirror 124 which in turn reflects the view downwardly onto split mirror 126a, 126b which splits the view being directed through the horizontal window 114. Mirror 126a directs the view onto mirror 128a which then reflects the view upwardly and angularly sidewardly through the horizontal window 114 and through the platter 116 and into the read volume. Similarly, mirror 126b directs the view onto mirror 128b which then reflects the view upwardly and angularly sidewardly through the horizontal window 114 and through the platter 116 and into the read volume. These views through the horizontal window 114 are thus for capturing views of the bottom side and potentially the checker side, the leading side and the trailing side of the item being passed through the read volume.

Figure 9C:
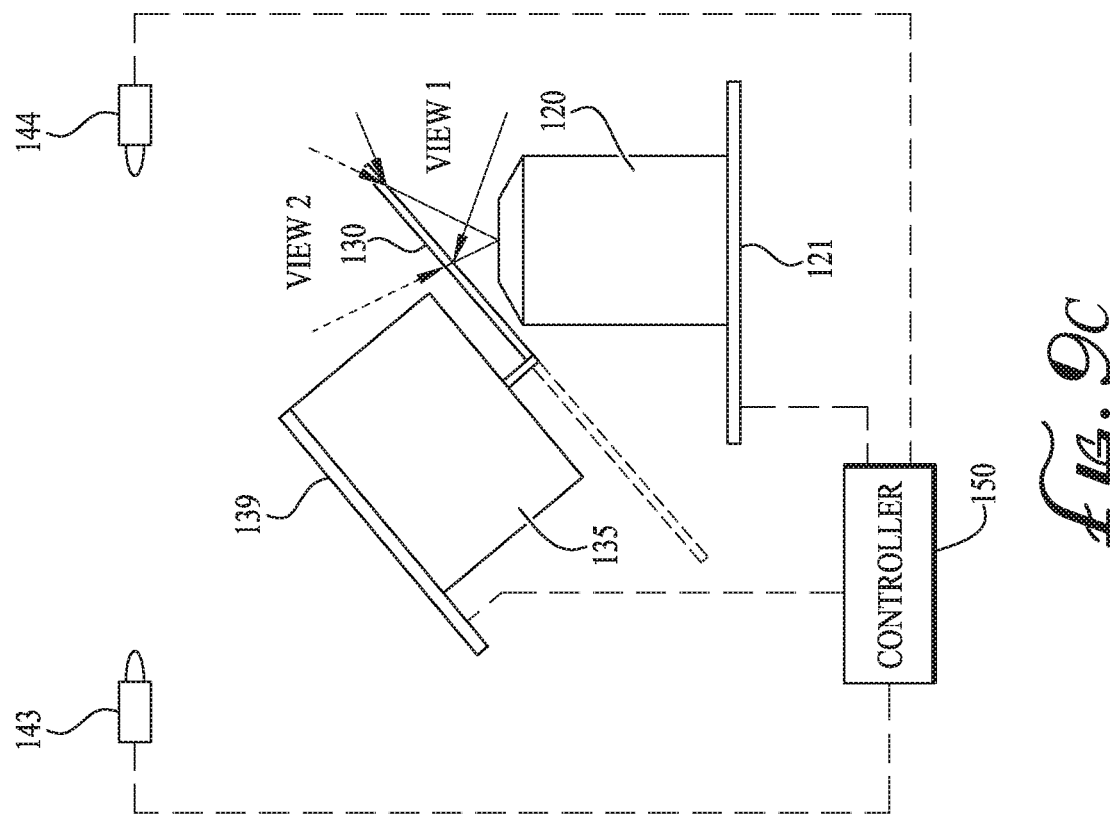
FIG. 9C is a diagram of a view separation system for an imaging data reader according to an alternate embodiment.

FIG. 9C illustrates an alternate motor and camera configuration, whereby the motor 135, may be mounted or disposed on a motor driver PCB (printed circuit board) 139 and the camera module 120 may be mounted or disposed on an imager PCB 121. A system controller 150 is connected to the controller of the camera module 120 (on PCB 121), the controller of the motor 135 (on PCB 139) and the controller for the illumination sources 143, 144. As applied to the embodiment of FIGS. 8A-8B, the illumination sources may comprise one or more LEDs 144 disposed in the top portion of the reader for illuminating View 1 out of the vertical window 112 and one or more LEDs 143 disposed in the lower portion of the reader for illuminating View 2 out of the horizontal window 114.

FIG. 9C further illustrates Illumination being provided via illumination sources which may comprise a lower LED 143 (or set of LEDs) and upper LED 144 (or set of LEDs). The lower LED 143 is directed sidewardly and upwardly through the window 116a in platter 116 (and also through the horizontal window 114) for illuminating sides of the object 220 for views through the horizontal window 114. The upper LED 144 is directed sidewardly and downwardly through the vertical window 112 for illuminating sides of the item 220 for views through the vertical window 112. The illumination sources 143 and 144 may comprise any suitable source of light, such as one or more light emitting diodes (LEDs), flash strobes, incandescent or fluorescent lamps, or halogen bulbs.

An illumination driver or controller is optionally provided. The illumination driver is configured to apply signals to the illumination sources 143, 144. According to one embodiment, the illumination driver drives the illumination source with a series of illumination pulses having a given pulse width, in timing with the image capture of the camera 120. In general, increasing the pulse width increases the perceived intensity of illumination by increasing the percentage of time in which the illumination source is on during the illumination pulse cycle (i.e., by increasing the duty cycle of the illumination waveform).

Figure 11:
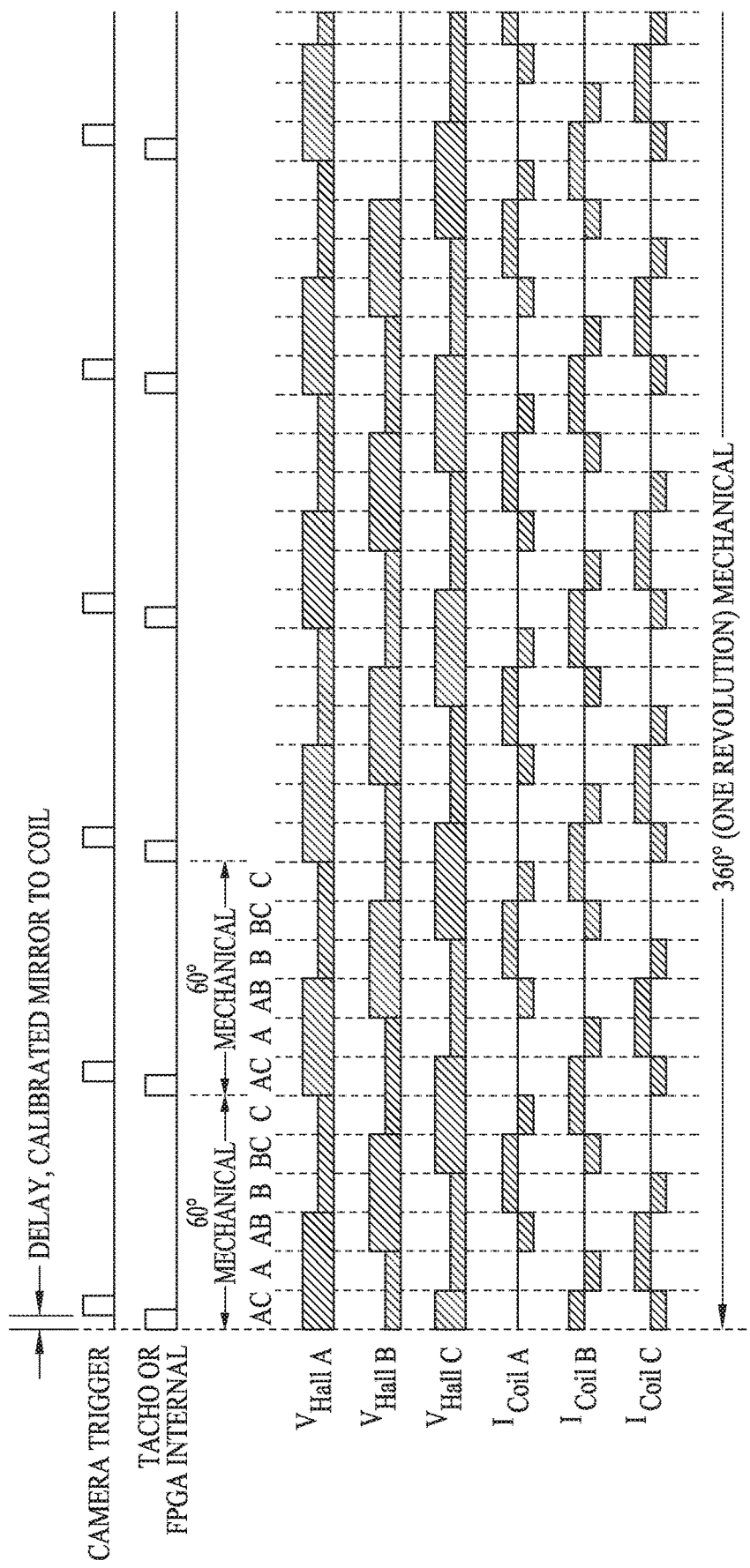
FIG. 11 are timing diagrams illustrating frame exposure timing for a brushless motor and imager trigger synchronization according to an embodiment.

The imager is controlled to capture images at the center of the mirror sections and void sections. FIG. 11 is a timing diagram illustrating frame exposure timing for a brushless motor and imager trigger synchronization according to an embodiment for the three mirror/three void system as in FIG. 9B. The BLDC (brushless dc) motor module includes the motor (stator and rotor) and drive circuit. In the case of Shinano Kenshi Co., Ltd model DR-24312-124 BLDC motor, the motor driver integrated circuit (IC) may comprise a model BA6859AFP IC available from Rohm Semiconductor, Japan.

Three Hall sensors are on the driver PCB to sense the magnetic field generated by the motor coil, and the signal from each sensor decodes the position of the rotor (and thus position of the mirror). $V_{Hall\ A,\ B,\ C}$ are the signals from each respective hall sensor A, B, C. In this case, each signal outputs 6 timing pulses per revolution. Typically, there is a signal from the motor driver IC (after processing the three Hall sensor signals, $V_{Hall\ A,\ B,\ C}$) that indicates the motor speed by its frequency and rotor location by the time of the pulses. The frequency of the signal from the motor drive IC indicates the motor speed and the pulse timing indicates the position of the rotor that the mirror mounted upon.

The graph of FIG. 11 illustrates relative timing of the camera trigger, tachometer (Tacho) pulse (derived from a Hall sensor signal), coil current and Hall sensor signals. $I_{coil\ A,\ B,\ C}$ are the currents injected to the motor coil by the motor driver that makes brushless direct current (BLDC) motor rotate, and the Hall sensors A, B, C on the PCB under the coils sense the magnetic field of the coils respectively, and the magnetic field signal corresponds to the positions of coils (that is, the mirror position). The Tacho signal is derived from one or three of the Hall sensors, which in the example system of FIG. 9B, the system has 6 signal pulses per revolution. The frequency of the signal is the motor speed. The time of the signal pulse corresponds to the position of the rotor. The signal pulse is used to trigger the camera directly. In the case of mirror disk and motor rotor is not aligned, it can be aligned electronically by delaying the Tacho signal pulse to trigger the camera as shown in FIG. 11. Alternately the trigger signal may generated, according to a given mirror/void configuration, from the Hall sensor signals by the field programmable gate array (FPGA) circuitry.

The view separation system may be calibrated via use of a calibration fixture as shown in FIG. 12. An alignment mark (such as an "X") is applied (on mirror protector film) to a center portion of one of the mirror sections of the rotating disk 130. An alignment fixture 200 positions a calibration mirror 210 to align in the View 1 field of view. In a calibration sequence, the rotating disk 130 is driven to steady state speed, and the view of the mirror section with the alignment mark is reflected back off of the calibration mirror 210 to the camera module 120. That time during rotation that the alignment mark "X" is detected by the camera module 120 thus provides the mis-alignment angle (Ae) between camera trigger and motor mirror center of the mirror section, to adjust the mirror disk relative to the motor rotor an angle of Ae, so that the mirror and camera trigger is aligned; Repeat the image capture after adjustment to confirm the alignment. Alternatively, when the mis-alignment is small, instead of adjusting the physical mirror disk, delaying the camera trigger pulse an angle of Ae in time domain will also align the camera trigger and mirror. For example, where the detected mis-alignment from captured image is 3 degrees, it is equivalent to 3/360=0.008333 revolution, if the motor speed is 1200 rpm, the time-delay=0.00833 rev/1200 rpm=0.00041667 seconds.

Through time division, exposure of the imager of camera module 120 (via the rotating disk 130) and optionally also spatial division (in the example of FIGS. 8A, 8B) of the fields of View 1 and View 2, the data reader 100 can utilize all or most of the imaging surface of the imager of camera module 120 to capture images of the field of View 1 and images the field of View 2.

The camera module 120 forms an electronic image of the fields of View 1 and View 2. The camera module 120 may include an imager and associated optics (e.g., lenses). The imager of the camera module 120 may comprise a set of pixel imaging elements arranged in a two-dimensional imaging plane or a wide range of image sensing devices for converting an optical image (or another wavelength in the electromagnetic spectrum) into an electrical signal, for example, a digital sensor, such as a charge-coupled device (CCD) imager or complimentary metal-oxide semiconductor (CMOS) imager, both of which form a one-dimensional or two-dimensional array of pixels, which together constitute an electronic representation of the image.

One suitable imager is the model EV76C560 from e2V Ltd. of Chelmsford, United Kingdom, for example. Other suitable imagers or camera devices may be employed, such as the model Python series global shutter imager from ON Semiconductor, Phoenix, Ariz., or model IMX252 available from Sony, Japan.

Referring again to the diagram of FIG. 9C, one or more illumination drivers or controllers are optionally provided. According to a preferred embodiment, an illumination driver drives the illumination sources 143 and 144 with a series of illumination pulses having a given pulse width, the illumination pulses being triggered by the same trigger signal as used by the imager. In one example, the pulse width is approximately 125 μs, but the pulse width depends on label-motion tolerance and can therefore include a range of suitable pulse widths from approximately 10 μs to approximately 600 μs. In general, increasing the pulse width increases the perceived intensity of illumination by increasing the percentage of time during which the illumination sources 143 and 144 are on (i.e., by increasing the duty cycle of the illumination waveform). The illumination source 143, illumination source 144, or both may be omitted in certain embodiments. The illumination sources 143 and 144 may be mounted within a housing of the data reader 100 (e.g., behind windows 112 and 114) or may be mounted external to the housing, such as on an exterior surface of the housing or remotely located from the data reader 100.

The driver on the imager PCB 121 and the illumination driver(s) may be connect to the system controller 150, which may be, for example, a processor, microprocessor, controller, microcontroller, FPGA, or the like. The connection may be via a bus or other communication mechanism, such as direct connections of a serial, parallel, or other type. The system controller 150 generally controls and coordinates the operation of other devices to which it is connected, such as one or more of the camera, the illumination driver, and a "good read" driver.

Thus the view separation system may operate by generating image data using a data reader having an imager, the method comprising: (a) directing a view of the imager toward a disk, wherein the disk includes a first reflective section and first transmissive section; (b) rotating the disk; (c) alternatingly (1) reflecting the view of the imager via the first reflective section of the disk along a first field of view and (2) passing the view of the imager through the first transmissive section of the disk along a second field of view; (d) at time T1, capturing a first image with the imager while the view of the imager is being reflected via the first reflective section of the disk along the first field of view; and (e) at time T2, capturing a second image with the imager while the view of the imager is being passed through the first transmissive section of the disk along the second field of view.

The system may further operate by (f) illuminating at time T1, via a first illumination source, the first field of view of the data reader with a first illumination pulse, such that the imager captures the first images during the first illumination source illuminating the first field of view with the first illumination pulse; and (g) Illuminating at time T2, via a second illumination source, the second field of view of the data reader with a second illumination pulse, such that the imager captures the second image during the second illumination source illuminating the second field of view with the second illumination pulse. The timing of the illumination pulses may be triggered by the same trigger signal as used by the imager.

The examples of rotating disks are shown with equal number of mirror sections to void sections, and have the mirror sections and void sections arranged in a balanced fashion, which may advantageously produce a balanced unit, rotationally speaking. Alternately, the disk may comprise unequal number of mirror sections to void section providing a higher (or lower) capture rate to View 1 over View 2. Alternately, the disk may comprise a single mirror section on one side and a single void section on the other side, and may further comprise balancing provided by other means such as weights.

According to one embodiment, the data reader 100 transmits the decoded optical code data to a host or another device (e.g., a computer, a point-of-sale terminal, a point-of-sale computer system, or a cash register). The transmission may be performed in a point-to-point manner or may be broadcast over a wired or wireless network. The host (or another device) may present data, prompts, and otherwise communicate with the user via one or more display devices. For example, the host (or another device) may present the decoded data to the user via a display, such as the object type (e.g., product type) corresponding to the scanned optical code and data associated with the object type (e.g., a price of the product). The data associated with the object type may be encoded in the optical code or accessed from a local or remote database based upon the object type. By way of another example, the host (or another device) may cause the decoded data to be recorded on a tangible medium. For example, the host (or another device) may instruct a printer to print the object type and data corresponding to the object type (e.g., print the product type and associated price on a receipt). The data reader 100 may also store the decoded optical code data in memory. For example, if the data reader is operating in a portable mode or the host is unavailable, the decoded data may be buffered by the data reader for later transmission in a batch mode. Additionally, the data reader may acknowledge that optical code data has been successfully decoded, such as by sounding a beep customarily associated with data readers.

The terms and descriptions used above are set forth by way of illustration only and are not meant as limitations. Skilled persons should understand that many variations can be made to the details of the above-described embodiments without departing from the underlying principles of the invention. The subject matter disclosed in any sentence or paragraph herein can be combined with the subject matter of one or more of any other sentences or paragraphs herein as long as such combinations are not mutually exclusive or inoperable. The scope of the present invention should, therefore, be determined only by the following claims.

The invention claimed is:

1. A method for generating image data using a bi-optic optical code reader, the method comprising:
   providing a housing including a vertical window and a horizontal window orthogonal to each other;
   providing a global shutter imager within the housing, the imager including a set of pixel imaging elements;
   directing a view of the imager toward a disk positioned within the housing, wherein the disk has alternating first reflective section and second transmissive section;
   rotating the disk;
   alternatingly (1) reflecting the view of the imager via the first reflective section of the disk along a first field of view through the vertical window and (2) passing the view of the imager through the first transmissive section of the disk along a second field of view through the horizontal window, wherein the first and second fields of view are directed toward the imager such that the first and second fields of view are focused onto substantially all of the set of pixel imaging elements of the imager;
   synchronizing image capture of the imager based on a determined rotational position of the disk such that:
      at time T1,
         triggering the imager when the view of the imager is being reflected via the first reflective section of the disk along the first field of view to capture a first image via the imager;

at time T2,
triggering the imager when the view of the imager is being passed through the first transmissive section of the disk along the second field of view to capture a second image via the imager; and
processing, via a processor, the sequence of first and second images to decode an optical code contained therein.

2. A method of claim 1, wherein the disk includes a second reflective section and a second transmissive section, wherein the reflective sections are alternatingly arranged with the transmissive sections, wherein synchronizing image capture of the imager based on the determined rotational position of the disk further comprises:
at time T3,
triggering the imager when the view of the imager is being reflected via the second reflective section of the disk along the first field of view to capture a third image via the imager; and
at time T4,
triggering the imager when the view of the imager is being passed through the second transmissive section of the disk along the second field of view to capture a fourth image via the imager.

3. A method of claim 1, further comprising:
illuminating at time T1, via a first illumination source, the first field of view of the data reader with a first illumination pulse, such that the imager captures the first image during the first illumination source illuminating the first field of view with the first illumination pulse; and
illuminating at time T2, via a second illumination source, the second field of view of the data reader with a second illumination pulse, such that the imager captures the second image during the second illumination source illuminating the second field of view with the second illumination pulse.

4. A method of claim 1, wherein synchronizing image capture of the imager based on the rotational position of the disk further comprises:
determining the rotational position of the rotating disk; and
generating a timing trigger signal based on the determined rotational position of the rotating disk to synchronize the steps of triggering the imager and capturing the first image and to synchronize the steps of triggering the imager and capturing the second image relative to the rotational position of the disk.

5. A method of claim 4, further comprising locating a magnet on the rotating disk and a Hall sensor on a printed circuit board positioned beside the rotating disk to determine the rotational position of the rotating disk, and using an output of the Hall sensor as the timing trigger signal to synchronize the steps of capturing the first image and the second image relative to the rotational position of the disk.

6. A method of claim 4, further comprising arranging a light source to face one side of the rotating disk and arranging a light detector to face a directly opposite side of the rotating disk to determine the rotational position of the rotating disk, and using light detector output as the timing trigger signal to synchronize the steps of triggering the imager and capturing the first image and triggering the imager and capturing the second image relative to the rotational position of the disk.

7. A method of claim 4, further comprising driving the rotating disk with a brushless direct current motor having a rotor, a motor coil, and a plurality of Hall sensors on a motor driver PCB that sense a magnetic field generated by the motor coil, and obtaining the timing trigger signal by decoding position of the rotor using a Hall sensor signal from each Hall sensor.

8. A method of claim 1, further comprising
generating a timing trigger signal based on the position of the rotating disk; and
triggering the imager, in response to the timing trigger signal, to capture the first image of the first field of view when the imager is aligned with the reflective section and to capture the second image of the second field of view when the imager is aligned with the transmissive section of the disk.

9. The method of claim 1, wherein the transmissive section is formed as an opening or void in the disk.

10. A bi-optical data reader, comprising:
a housing having a vertical window and a horizontal window orthogonal to each other;
a global shutter imager within the housing, the imager including a set of pixel imaging elements arranged in a two-dimensional imaging plane;
a lens in optical association with the imager and configured to focus one or more fields of view onto substantially all of the pixel imaging elements of the imager;
a rotating disk, positioned within the housing having alternating reflective and transmissive sections, wherein the disk when rotated is operative to alternatingly (1) reflect the view of the imager with the reflective section of the disk along a first field of view through the vertical window and (2) pass the view of the imager through the transmissive section of the disk along a second field of view through the horizontal window;
a synchronization system in operative communication with the rotating disk, the synchronization system operable to synchronize image capture of the imager based on a rotational position of the rotating by generating a timing trigger signal based on the rotational position of the rotating disk, and alternatingly triggering the image capture one or more images of the first and second fields of view by the imager responsive to the timing trigger signal;
a controller in operative association with the synchronization system and the imager, the controller operative to, in response to the timing trigger signal, trigger the imager to capture an image of the first field of view when the imager is aligned with the reflective section of the rotating disk, and to capture an image of the second field of view when the imager is aligned with the transmissive section of the disk; and
a processor configured to process the images of the first and second fields of views to decode an optical code contained therein.

11. A bi-optical data reader according to claim 10, wherein the synchronization system comprises a magnet on the rotating disk and a Hall sensor on a printed circuit board positioned beside the rotating disk, the Hall sensor output serving as the timing trigger signal for the synchronization system to synchronize image capture relative to rotating disk position.

12. A bi-optical data reader according to claim 10, wherein the synchronization system comprises a light source arranged to face one side of the rotating disk and a light detector arranged to face a directly opposite side of the rotating disk, the light detector output serving as the timing trigger signal for the synchronization system to synchronize image capture relative to rotating disk position.

13. A bi-optical data reader according to claim 10, further comprising a motor connected to and driving the rotating disk, wherein the motor comprises a brushless direct current motor having a rotor, a motor coil, and three Hall sensors on a motor driver PCB that sense a magnetic field generated by the motor coil, wherein a Hall sensor signal from each Hall sensor decodes a position of the rotor, and wherein the synchronization system comprises a timing signal processed from the three Hall sensor signals.

14. A bi-optical data reader according to claim 10, further comprising:
- a first set of one or more fixed mirrors in optical association with the rotating disk and the imager, wherein the first set of one or more fixed mirrors are configured to redirect the first field of view toward a first side of the rotating disk.

15. A bi-optical code reader of claim 10, further comprising:
- a light source to face one side of the rotating disk and arranging a light detector to face the same side of the rotating disk to determine the rotational position of the rotating disk, and wherein the synchronization system is operable to use the light detector output as the timing trigger signal to synchronize the steps of triggering the imager and capturing the images relative to the rotational position of the disk.

16. A bi-optical data reader, comprising:
- a housing having a vertical window and a horizontal window orthogonal to each other;
- a global shutter imager within the housing, the imager including a set of pixel imaging elements;
- a lens in optical association with the imager and configured to focus one or more fields of view onto the imager;
- a rotating disk positioned within the housing having at least one reflective section and at least one transmissive section, wherein as it is rotated the disk is operative to (1) reflect the view of the imager with the reflective section of the disk along a first field of view through the vertical window and (2) pass the view of the imager through the transmissive section of the disk along a second field of view through the horizontal window, wherein the first and second fields of view are directed toward the imager such that the first and second fields of view are focused onto substantially all of the set of pixel imaging elements of the imager; and
- a synchronization system in operative communication with the rotating disk, the synchronization system operable to determine a rotational position of the rotating disk, and generate a timing trigger signal based on the rotational position of the rotating disk, wherein the imager is alternately triggered at each of the at least one reflective section and the at least one transmissive section to capture one or more images of the first and second fields of view responsive to the timing trigger signal;
- a controller in operative association with the synchronization system and the imager, the controller operative to, in response to the timing trigger signal, trigger the imager to capture an image of the first field of view when the imager is aligned with the reflective section of the rotating disk and to capture an image of the second field of view when the imager is aligned with the transmissive section of the rotating disk; and
- a processor configured to process the images of the first and second fields of views to decode an optical code contained therein.

17. A bi-optical code reader of claim 16, wherein the first field of view and the second field of view overlap to form a read volume through which an object is passed to read the optical code.

18. A bi-optical code reader of claim 16, wherein a number of reflective sections and transmissive sections of the disk are equal.

19. A bi-optical code reader of claim 16, wherein a number of reflective sections and transmissive sections of the disk are unequal.

20. A bi-optical code reader of claim 16, wherein the disk includes a weight to provide a desired capture rate between the first field of view and the second field of view.

* * * * *